Sept. 22, 1936.  J. EGGERT ET AL  2,055,069
PHOTOGRAPHIC PRINTING
Filed Jan. 6, 1934  2 Sheets-Sheet 1
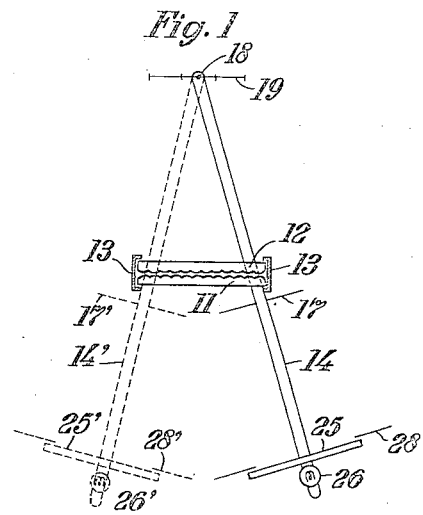
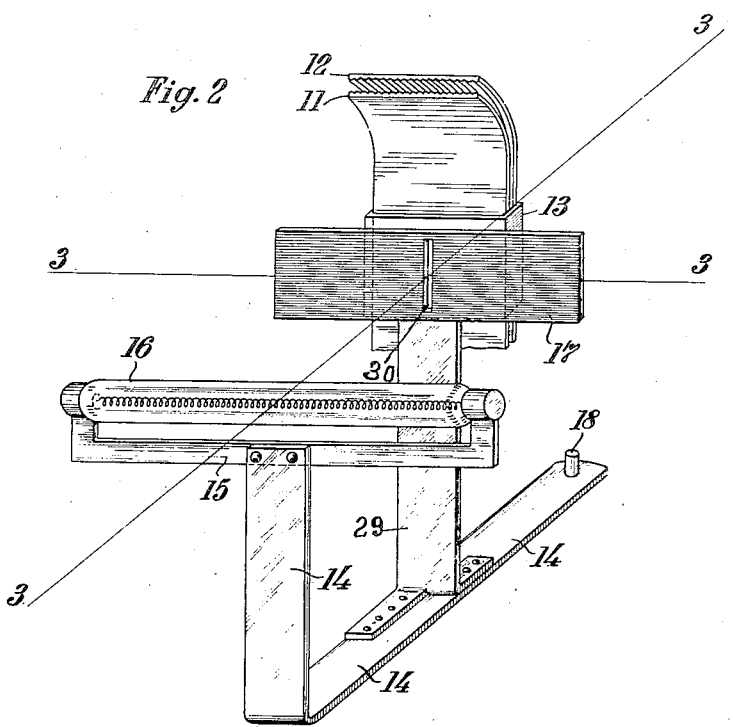

Patented Sept. 22, 1936

2,055,069

UNITED STATES PATENT OFFICE 2,055,069

PHOTOGRAPHIC PRINTING

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application January 6, 1934, Serial No. 705,604
In Germany January 14, 1933

4 Claims. (Cl. 95—75)

Our present invention relates to photographic printing and more particularly to printing lenticular films.

Figure 3:
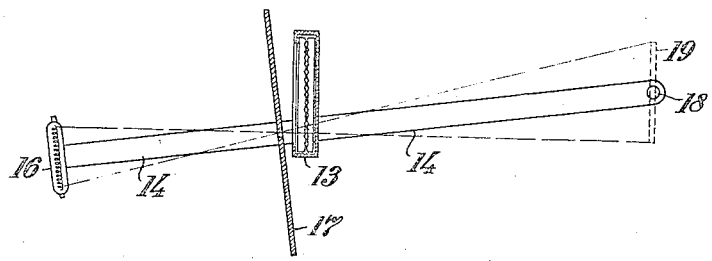
Figure 4:
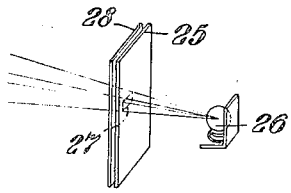
Figure 5:
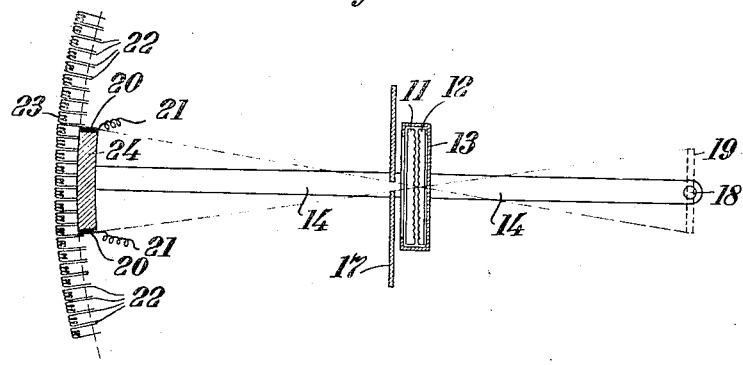

One of its objects is to provide an improved process of this kind. Another object is an apparatus for carrying out our improved process. Further objects will be seen from the detailed specification following hereafter. Reference is made to the accompanying drawings in which Figure 1 shows diagrammatically an apparatus according to this invention, Fig. 2 shows a conventional view of an apparatus for printing according to our invention, Fig. 3 shows a section of Fig. 2 on the lines 3—3, Fig. 4 shows diagrammatically a plan view of another arrangement for printing according to our invention, and Fig. 5 shows an illuminating device which may be used instead of the linolite lamp shown in Figs. 2 and 3.

In printing color-record images from a lenticular film on to a light-sensitive lenticular film by contact, the original film, as it is called, and the film to be printed on are placed with their embossed sides facing each other, and the exposure is through the emulsion layer of the original film. When exposure is made with direct light, as is necessary in printing lenticular films, the known phenomena producing moiré effects occur. In order to eliminate these moiré effects numerous expedients have been proposed; for instance, optical elements have been placed between the source of light and the film, or each individual picture has been displaced in printing by the breadth of one lenticular element with relation to the film to be printed on.

According to this invention the formation of moiré effects in contact printing is avoided by the mere application of mechanical means, without displacing the lenticular embossings of the original with relation to the film to be printed on. For this purpose the printing film is arranged in contact with the original with the embossings facing each other and is exposed through the original to a source of light limited both in a direction parallel to the lenticular elements and in a direction transversely thereof. This source of light is reciprocated while printing each individual picture in such a manner that, in either end position the center of the source of light, the border of the gate aperture and the center of that plane which, during exposure of the original film, is occupied by the virtual image of the exposure filter, lie on a straight line.

In the accompanying drawings, Fig. 1 represents diagrammatically an arrangement in accordance with the present invention. In this figure of the drawings 11 is the original film and 12 is the printing film having thin embossed sides in contact. 19 is the virtual filter image of the exposure filter, through which the original film 11 has been exposed. 18 is the center of the virtual image of the exposure filter 19. The source of light consists of a slotted diaphragm 28, a piece of ground glass 25 placed behind the slot and an incandescent lamp 26 behind the ground glass, or it may consist of a simple incandescent thread. In the direction perpendicularly to that of the cylindrical lenses this source of light has at least such an extension that it subtends the same angle as is subtended by the virtual image of the exposure filter 19 when viewed from the film. Near the gate 13 is placed a slotted diaphragm 17 which in its longitudinal direction extends parallel to the direction of the lenticular elements and in this direction leaves the aperture uncovered throughout its extension. The breadth of the slot has an influence on the produced picture. It is possible to obtain pictures with a slot having a breadth equal to 25 per cent or more of the breadth of the film, however, good results will be obtained with a slot having a breadth equal up to about 5 per cent of the breadth of the film. During the exposure of each individual picture, both the source of light consisting of the incandescent lamp 26, the ground glass plate 25, and the diaphragm 28, and the slotted diaphragm 17 make one reciprocatory movement between the two end positions which are indicated by giving the numerals of corresponding parts in one of these positions an apostrophe. At any point of the movement the center of the unmasked part of the ground glass plate 25, the center of the slot 17 and the point 18 must be on a straight line. For this purpose the slot and the source of light are mounted on a common support 14 which moves about 18 as a pivot.

Instead of the source of light shown in Fig. 1 there may also be used a stationary source of light which in the direction parallel to that of the lenticular elements has only a small extension, for instance, by masking the source of light by a slotted diaphragm. In front of the source of light thus limited another slotted diaphragm is arranged parallel to the lenticular elements which is moved to and fro. The end positions of this slotted diaphragm are the same as the end positions of the source of light as shown in Fig. 1.

In order to avoid moving the slot and the source of light, there may be substituted for this latter a number of individual lamps which are so connected that a definite number of them may be switched on in succession in a well-known manner. The individual lamps must correspond as to width and position with the source of light which they replace.

An arrangement for printing according to this invention will be more clearly seen from Figs. 2 and 3. In these figures the original lenticular film 11 and the printing film 12 are passed in contact through the gate 13. Near the gate there is placed the diaphragm 30 provided with a slot 17. In front of the diaphragm there is arranged the linolite lamp 16. This linolite lamp has such a breadth that it subtends at least the same angle when viewed from the original as is subtended by the virtual image of the exposure filter with relation to the original. The lever 14 is rotatable about a pivot 18. This pivot lies at the point which would be occupied by the optical center of the virtual image of the exposure filter with relation to the original. The lever 14 carries the mount 15 of the linolite lamp 16 and by means of the arm 29 the diaphragm 17. During each printing step the lever 14 is so rotated that the diaphragm 17 passes over the whole breadth of the film.

Instead of using a linolite lamp there may also be used an illuminating device as illustrated in Fig. 4. In this figure, 26 is a source of light which projects light on the ground glass plate 25 covered on the side remote from the source of light by the diaphragm 28. This diaphragm is provided with a slot 27 which in the direction perpendicular to the lenticular elements has a breadth which fulfils the above condition stated with regard to the breadth of the linolite lamp and which in the direction parallel to the lenticular elements has as small a breadth as possible.

Fig. 5 shows another arrangement for printing according to this invention. Through the picture gate 13 there are passed the original lenticular film 11 and the lenticular printing film 12 in contact. The lever 14 which is rotatable about a pivot 18 placed at the point which would be occupied by the center of the exposure filter 19 (shown for the sake of clarity in dotted lines) with relation to the original, carries the slotted diaphragm 17 arranged near the gate 13. At 23 there are arranged a series of individual lamps on an arc which has the pivot 18 as centre or there is arranged a continuous incandescent filament forming such an arc. From this arc branch off a plurality of contacts. At its end remote from the pivot 18, the lever 14 carries a bord 24 which at both ends is provided with contacts 20. These contacts 20 are connected with a source of electric energy and spaced apart so that they subtend the same angle when viewed from the original as is subtended by the exposure filter 19 (shown for the sake of clarity in dotted lines). Thus, when rotating the lever there will always be switched on light in the required breadth.

What we claim is:

1. In an apparatus for printing lenticular films in combination a gate provided with an aperture, a lenticular film bearing an original and a light-sensitive lenticular film in contact with their lenticular elements facing each other, in said gate, a source of light arranged on the side of said original and having at least such a breadth that it is seen under the same angle as the virtual image of the taking filter when viewed from the film, a slotted diaphragm arranged near said gate, the breadth of the slot being at most equal to 25 per cent of the breadth of the films, and means for reciprocating said source of light and said slotted diaphragm arranged such that the centers of said source of light and of said slotted diaphragm form a straight line, on an arc having as its center the point which would be occupied by the center of the exposure filter with relation to the original.

2. In an apparatus for printing lenticular films in combination a gate provided with an aperture, a lenticular film bearing an original and a light-sensitive lenticular film in contact with their lenticular elements facing each other in said gate a source of light arranged on the side of the original comprising a disk of ground glass illuminated by an incandescent lamp arranged on the side of the original and limited by diaphragms so that it has at least such a breadth that it is seen under the same angle as the virtual image of the taking filter when viewed from the film and only a small extension as regards its length, a slotted diaphragm arranged near said gate the breadth of the slot being at most equal to 25 per cent of the breadth of the films and means for reciprocating said source of light and said slotted diaphragm arranged such that the centers of said source of light and of said slotted diaphragm form a straight line, on an arc having as its center the point which would be occupied by the center of the exposure filter with relation to the original.

3. In an apparatus for printing lenticular films in combination a gate provided with an aperture, a lenticular film bearing an original and a light-sensitive lenticular film in contact with their lenticular elements facing each other, in said gate, a slot-shaped source of light arranged on the side of the original extending in the direction parallel to the lenticular elements and diaphragm before said slot-shaped source of light cutting out a portion of at least such a breadth that the latter is seen under the same angle as the virtual image of the taking filter when viewed from the film, a slotted diaphragm near said gate the breadth of the slot being at most equal to 25 per cent of the breadth of the films, and means for reciprocating said diaphragm before said slot-shaped source of light and said slotted diaphragm arranged such that the centers of both diaphragms form a straight line, on an arc having as its center the point which would be occupied by the center of the exposure filter with relation to the original.

4. In an apparatus for printing lenticular films in combination a gate provided with an aperture, a lenticular film bearing an original and a light-sensitive lenticular film in contact with their lenticular elements facing each other, in said gate, an illuminating device arranged on the side of the original comprising a series of individual sources of light which can be switched on one after the other having at least such a breadth that they are seen under the same angle as the virtual image of the taking filter when viewed from the film, a slotted diaphragm near said gate the breadth of the slot being at most equal to 25 per cent of the breadth of the films, and means for reciprocating said diaphragm, on an arc having its center the point which would be occupied by the center of the exposure filter.

JOHN EGGERT.
GERD HEYMER.